United States Patent Office
3,445,459
Patented May 20, 1969

3,445,459
e-CAPROIMIDO PYRIDAZINES
Edward W. Pietrusza, Morris Township, Morris County, and Rudolph Pinter, Morristown, N.J., assignors to Allied Chemical Corporation, New York, N.Y., a corporation of New York
No Drawing. Continuation-in-part of application Ser. No. 185,537, Apr. 6, 1962. This application Apr. 4, 1966, Ser. No. 539,720
Int. Cl. C07d 57/22, 41/06; C08g 20/12
U.S. Cl. 260—239.3          2 Claims

ABSTRACT OF THE DISCLOSURE

The present invention relates to the preparation of the e-caproimido pyridazines from substituted pyridazines and metal salts of e-caprolactam. These pyridazines are useful in promoting the polymerization of lactams as described in the copending application Ser. No. 185,537, filed Apr. 6, 1962. Particularly outstanding as a promoter is 3,6-di(e-caproimido)pyridazine which is a novel compound.

This application is a continuation-in-part of our copending United States application Ser. No. 185,537, filed Apr. 6, 1962, now U.S. Patent 3,250,750.

With the utilization of the promoters of the invention, polymerization of lactams can be effected at temperatures below the softening point of the resulting polymer. It is well known that in the polymerization of e-caprolactam a chemical equilibrium is found between low molecular weight materials and the polymer. At temperatures in excess of the softening point of poly-e-caprolactam, the presence of appreciable quantities of monomeric e-caprolactam and its dimers and trimers is permitted by the equilibrium, whereas below said temperature the formation of the polymer is more highly favored. Thus the use of our promoters obviates purification of the product polymer which is usually required before a polycaproamide formed at high temperature can be employed industrially.

In addition, the polycaproamides produced in accordance with our invention contain pyridazide end groups and, accordingly, are inherently more stable than, for example, polycaproamides formed by acid catalysts toward oxidation and heat.

We have discovered that the above pyridazines are produced by heating a metal salt of e-caprolactam and a pyridazine, i.e., a 1,2-diazine, which bears on one of its 3- and 6-positions a substituent attached by a more electronegative atom than the nitrogen of lactam, hence being replaceable by metathesis with the metal salt of e-caprolactam, and on the remaining carbon atoms of the ring bears such replaceable substituent or hydrogen or a substituent inert toward the metal salt of e-caprolactam.

By metathesis, the metal from the lactam salt combines with the replaceable substituents present on at least one of the 3- and 6-positions, and the lactam residue replaces said substituents. Substituents replaceable by this metathesis includes halogen atoms and substituents attached to a carbon atom of the pyridazine ring by an oxygen atom. Illustrative of such replaceable substituents are chloro, hydroxy, alkoxy, aryloxy, arylalkoxy, cycloalkoxy, alkylamine, arylamine, arylalkylamine, and alkylamino. Where it is desired to obtain reaction at both of the 3- and 6-positions in order to prepare a 3,6-di(e-caproimido)pyridazine, it is advantageous to employ as the replaceable substituents chloro, methoxy or phenoxy.

The promoters can be prepared for the purpose of isolation by heating in a diluent such as benzene a metal salt of the caprolactam and a pyridazine which bears on its carbon atoms substituents chosen in the above-described manner. The metal salt of the e-caprolactam will ordinarily be prepared by heating, with e-caprolactam, a strong base such as an alkali or alkaline earth metal, including magnesium, or hydride or amide or hydroxide thereof, or the metal oxide or salt of a weak acid. Such reaction is illustrated by the following Equation I:

(I) 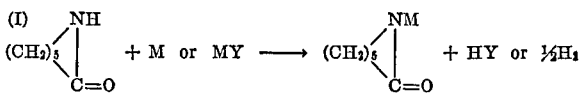

where M is an alkali metal such as lithium, sodium, potassium, rubidium, cesium; or alloy thereof; or alkaline earth metal such as calcium and including magnesium; and Y is an anionic species such as hydride, hydroxide, carbonate, amide, oxide, salt of carboxylic acid, and those carbanions derived from such hydrocarbon species as alkanes, cycloalkanes, arylalkanes and the benzenoids. Illustrative examples of the last-named species of anions are

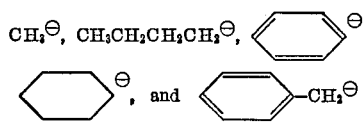

Suitably, the salt-forming metal or compound is admixed under anhydrous conditions with the lactam to form a reaction mixture comprising from about 0.1 to about 1.0, advantageously from about 0.5 to about 0.9 equivalents, of said metal per molecular proportion of lactam. While these ratios of reactants are preferred, a large excess of lactam can be present. The temperature of the mixture is brought to a level at which interaction is complete between salt-forming metal or compound and the lactam. Suitable temperatures are in the range from about 90° C. to about 130° C.

The metal salts are relatively stable at temperatures of 20°–25° C. for a period of at least one month and even at higher temperatures, e.g., 90° C., the time of stability is about four days. Accordingly, the salt can be prepared and stored if desired.

The addition of a substituted pyridazine to the caprolactam metal salt produced by the process illustrated in Equation I results in the formation of an e-caproimido pyridazine as illustrated by the following Equation II:

(II) 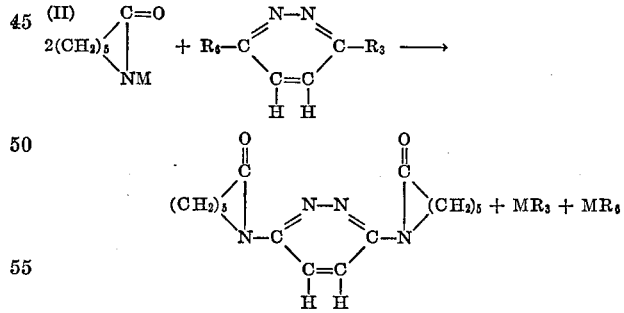

where M has the meaning given above; $R_3$ and $R_6$ are replaceable substituents as defined above, and the pyridazine product is a 3,6-di(e-caproimido)pyridazine. While the above equation illustrates a reaction where both $R_3$ and $R_6$ are replaceable substitutents, it is to be understood that any one or both of these substituents can be inert toward metal salts of caprolactum, e.g., hydrogen or hydrocarbon groups free of olefinic unsaturation, with the result that no reaction takes place at the corresponding position.

The reaction between the substituted pyridazine and the caprolactam metal salt is carried out in an organic diluent, preferably at a temperature of about 50° C. to 120° C., with particularly good results being obtained at about 60° C. to 90° C. The diluent employed can be any dry organic compound which under the reaction conditions is liquid and does not react with any of the other compounds present. Illustrative of suitable diluents are benzene, xylene and toluene. Lactams such as e-caprolactam can also be used as the diluent. However, if it is desired to isolate the e-caproimido pyridazine, care must be taken not to exceed 120° C. and thereby initiate polymerization of the lactam.

The detailed description of our process and the examples which follow set forth particulary the employment of lithium hydride and 3,6-dichloropyridazine in our process, but it is to be understood that these specific compounds and the conditions cited for use therewith are illustrative rather than limiting; and that the same principles and general procedures apply when using other metals or other metal compounds as defined above and when using other pyridazine derivatives, including in particular 3-chloropyridazine, 3,6-diphenoxypyridazine and 3-phenoxy-pyridazine, and mixed derivatives such as the monochlorophenoxy pyridazines, also like pyridazines additionally substituted by one or more inert substituents. Illustrative examples of pyridazines suitable as starting materials for reaction with lactam salts to form the promoters of our invention are 3,6-dichloropyridazine
3,6-dihydroxypyridazine
3-chloropyridazine
3-bromopyridazine
3-iodo-6-chloropyridazine
3-chloro-6-fluoropyridazine
3-hydroxy-6-methylpyridazine
3-chloro-6-hexoxypyridazine
3,6-dimethoxypyridazine
3,6-diphenoxypyridazine
3-cyclohexyl-6-bromopyridazine
3-benzyl-6-chloropyridazine
3,6-di(methylamino)pyridazine
3,6-dihexoxypyridazine
3,6-dibenzyloxypyridazine
3,6-dibenzylaminopyridazine
3-chloro-6-methoxypyridazine
3-chloro-6-decyloxypyridazine
3-chloro-6-butylpyridazine
3-phenyl-6-chloropyridazine
3-hydroxypyridazine
3,6-diethoxypyridazine Pyridazines suitable for use in our process are readily available. For instance, 3,6-dihydroxypyridazine is readily synthesized from maleic anhydride; and this can be converted to 3,6-dichloropyridazine by heating with phosphorus oxychloride (Mizzoni et al., J. Am. Chem. Soc., 73, 1873 [1951]). These chlorides can be converted to alkoxy, phenoxy, etc., pyridazines by heating with the sodium salt of the appropriate alcohol or phenol.

In one of the best modes contemplated by us for carrying out our invention, the metal salt of e-caprolactam, e.g., the lithium salt, may be prepared as follows:

EXAMPLE 1

Four liters of distilled dry xylene and 136 grams (1.2 mols) of distilled dry caprolactam were introduced into a 5-liter 3-necked flask, heated with an electric mantle, and equipped with a mechanical stirrer, reflux condenser, and the necessary gas lines. A dry nitrogen atmosphere was maintained throughout the operation. The solution was heated to 90°–100° C./750 mm. and under a blanket of dry, oxygen-free nitrogen 7.9 grams (1.0 mol) of lithium hydride was added with stirring. Reaction proceeded as indicated by the evolution of hydrogen and the precipitation of a flocculent solid. The temperature was slowly raised to 140° C. and with stirring the reaction was allowed to continue for 2 hours until the evolution of hydrogen had subsided.

The reaction mixture was cooled to room temperature and filtered under a blanket of dry nitrogen. The isolated precipitate was washed twice with 200 cc. of dry, hot benzene and then heated under reduced pressures for 24 hours at 80°–90° C./5–10 mm. nitrogen. There was obtained 110 grams (92.5% yield) of a white product, melting point 310°–340° C. with decomposition, which was found by infrared and elemental analyses to be the lithium salt of e-caprolactam.

The following examples are illustrative of our invention and describe a specific embodiment of our invention, but the invention is not to be interpreted as limited to all details of the examples.

EXAMPLE 2

Thirty grams of essentially pure lithium salt of e-caprolactam, prepared as in Example 1 above, (0.25 mol) was slurried in dry benzene (500 cc.) and 7.5 grams of 3,6-dichloropyridazine (0.05 mol) was slowly added under dry nitrogen at 70° C. with stirring. After refluxing two hours, the solid residue (excess lithium salt of caprolactam and LiCl) was filtered off. Upon evaporating the benzene at reduced pressure, a residue was obtained which was extracted with hot n-heptane. Removal of n-heptane from the extract by evaporation left a viscous oil. Analysis for carbon, hydrogen, nitrogen, and chlorine closely checked the theoretical for substitution of one of two chlorine atoms by a caprolactam residue, e.g., for 3-chloro-6-(e-caproimido)pyridazine. Infrared examination confirmed the identification showing absorption bands for the pyridazine and e-caprolactam moieties.

EXAMPLE 3

Twenty-two grams (0.195 mol) of distilled, dry e-caprolactam was heated with 3.0 grams (0.02 mol) 3,6-dichloropyridazine to 110° C. agitating the mixture with a stream of dry nitrogen gas. Maintaining the temperature below 125° C., small amounts of lithium hydride were added over a two-hour period until 0.47 gram (0.059 mol) was introduced.

After keeping the reaction mixture at 120° C. overnight, it was cooled and then extracted with chloroform. The chloroform was evaporated, and the viscous residue taken up with anhydrous methanol. Filtration yielded a crop of small, lustrous, tan-colored platelets. After washing with methanol and drying, the crystalline product melted at 220°–223° C. Analysis for carbon and hydrogen checked closely the theoretical for substitution of the two chlorine atoms by two caprolactam moieties, e.g., for 3,6-di(e-caproimido)pyridazine. Analysis for chlorine indicated a negligible amount was present. Infrared examination confirmed the identity of the desired di-substituted pyridazine showing absorption bands for the pyridazine and e-caprolactam moieties.

We claim:
1. The compound 3-chloro-6-(e-caproimido)pyridazine.
2. The compound 3,6-di(e-caproimido)pyridazine.

References Cited

UNITED STATES PATENTS

| | | | |
|---|---|---|---|
| 3,249,590 | 5/1966 | Pietrusza et al. | 260—239.3 |
| 3,250,750 | 5/1966 | Pietrusza et al. | 260—239.3 |
| 3,251,799 | 5/1966 | Pietrusza et al. | 260—239.3 |

HENRY R. JILES, *Primary Examiner.*

R. T. BOND, *Assistant Examiner.*

U.S. Cl. X.R.

260—78, 250